May 6, 1941.  K. J. DE JUHASZ  2,240,492
MAXIMUM PRESSURE GAUGE
Filed Dec. 7, 1938
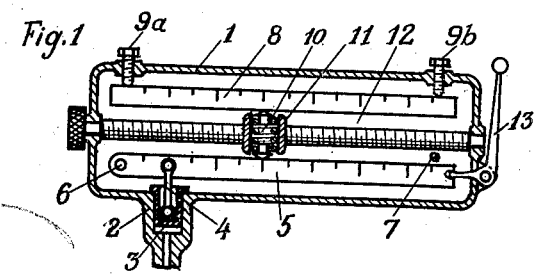
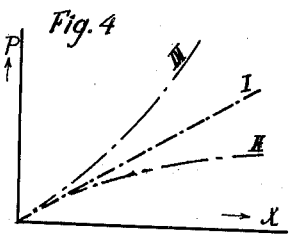
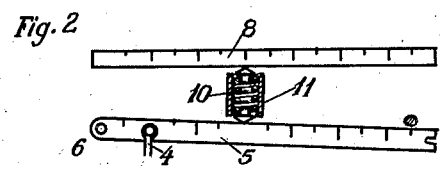
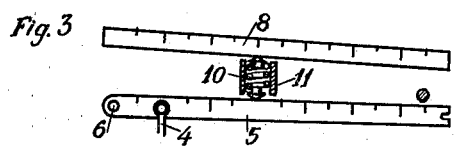
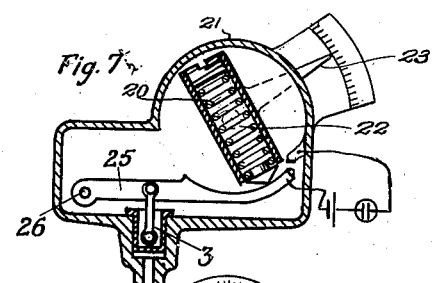
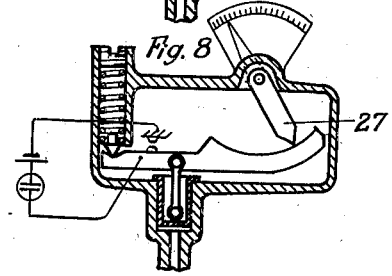
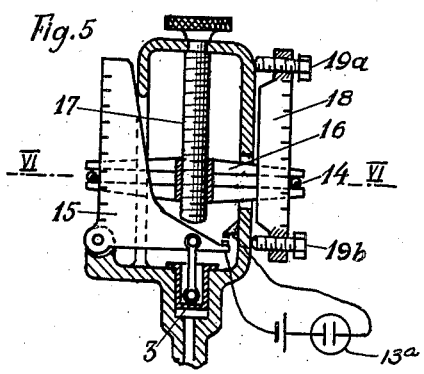
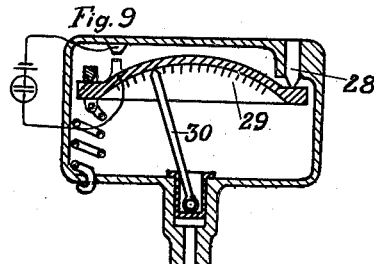
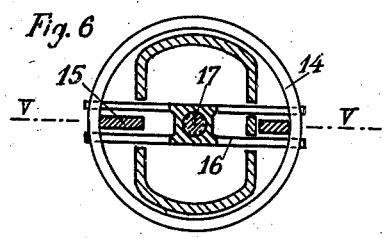
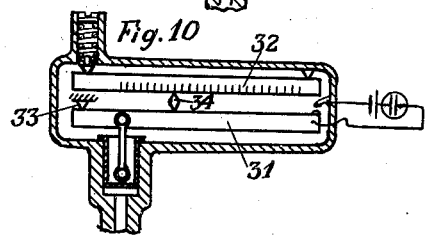
Witness:
Rudolf K. Menhard
Inventor
Kalman John De Juhasz Patented May 6, 1941

2,240,492

UNITED STATES PATENT OFFICE 2,240,492

MAXIMUM PRESSURE GAUGE

Kalman John De Juhasz, State College, Pa.

Application December 7, 1938, Serial No. 244,374

5 Claims. (Cl. 73—111)

My invention relates to improvements in gauges for measuring the maximum value of variable pressures, in particular that of the cyclically recurring compression and combustion pressures occurring in the cylinders of internal combustion engines.

In the prior art maximum pressure gauges employ a piston movable in a cylinder which is brought into communication with the cyclically varying pressure. The pressure force exerted on the piston is counteracted by a regulable spring force acting on the piston. As long as the spring force is less than the maximum value of the pressure force the piston will move within its limits of motion. In measuring the maximum pressure the spring force is increased until the motion of the piston just ceases which condition is indicated either mechanically by means of a tell-tale pointer magnifying the motion of the piston, or electrically by a piston-operated contactor actuating a signal-lamp preferably of the neon-light type. The maximum pressure will be then indicated by the strain, i. e., lengthening or shortening of the measuring spring used, which can be read on a scale, micrometer, dial, or counter in terms of pressure units.

While this principle was found usable in practice yet it was found that these instruments are subject to errors due to the variability of the stress-strain ratio of the spring as a consequence of ageing, fatigue and temperature effects.

The object of my invention is to minimize these harmful influences and thus provide a pressure gauge of improved accuracy, of increased useful life, and of greater convenience in operation.

The essential feature of my invention is that the spring force is transmitted to the piston not directly but through an interposed lever or lever-system of variable leverage. The strain in the spring is kept either unaltered, or varied only within narrow limits, and the variation of the force acting upon the piston is attained solely or mainly by varying the interposed lever-ratio. In virtue of this arrangement there is no necessity to use a spring having an accurate calibration in a wide range of strain, because in the process of measurements the stress in the spring is changed only little or not at all. The fatigue effects are thereby reduced. Furthermore this principle makes it possible to remove the spring from the close proximity to the hot parts of the instrument whereby also the temperature errors are avoided.

My invention is illustrated by the attached drawing in which Fig. 1 is the sectional elevation of an embodiment of my invention employing a helical spring under compressive stress;

Fig. 2 and Fig. 3 show modifications of the lever arrangement of the embodiment according to Fig. 1;

Fig. 4 is a calibration chart showing the force P exerted on the piston as the function of the spring displacement, referring to the embodiment according to Figs. 1, 2 and 3;

Fig. 5 is a sectional elevation along the line V—V of Figure 6 and Fig. 6 a sectional plan view along the line VI—VI of Fig. 5 of another embodiment employing a ring-shaped spring in tension;

Fig. 7 is the sectional elevation of another embodiment of the invention showing a spring with rotational adjustment;

Fig. 8 is the sectional elevation of another embodiment of the invention in which the spring is held stationary and the position of the lever fulcrum is varied;

Fig. 9 is a sectional elevation of another embodiment of the invention in which the position of the point of attack of the piston force is varied;

Fig. 10 is the sectional elevation of another embodiment employing a compound lever.

In the embodiment of my invention illustrated in Fig. 1 in the housing 1 a cylinder 2 is mounted in which the piston 3 can move substantially airtight and with little friction. The cylinder 2 is brought into communication with the pressure-space to be tested. The pressure force acting upon the piston 3 is transmitted through rod 4 to lever 5 which can execute about the fulcrum 6 a small angular motion limited in the one direction by the upper rim of the piston resting against the cylinder rim, and in the other direction by the stop 7 arranged in the housing. Substantially parallel with the lever 5 the stationary bar 8 is mounted in the housing which bar is adjustable by the two screws 9a and 9b. Between the lever 5 and bare 8 is located the spring 10 precompressed so as to exert a definite known force tending to press the lever against the piston 3. The spring is confined laterally within the shell 11 which however does not restrain its motion in the direction of the spring axis. The shell 11, together with the spring 10 contained within it can be moved laterally along the lever 5 by means of the screw 12, or some other equivalent device, mounted in the housing. Thereby the leverage, and thus the force resisting the motion of the piston, can be changed without changing the strain of the spring. The pre-compression of the spring can be, however, changed by bringing the bar 8 closer to or farther from the lever 5 by means of the adjusting screws 9a and 9b. In operation the piston is subjected to the variable pressure, e. g., that existing in the cylinder of an internal combustion engine. If the lever force acting through rod 4 upon the piston 3 is less than that due to the maximum cylinder pressure than the piston 3 and also the lever 5 will execute a small motion. In order to make this small motion more clearly visible a tell-tale pointer 13 may be provided. The position of the spring 10 has to be changed by means of turning the screw 12 so as to increase the leverage and thereby increase the force on the piston until the motion of the lever 5, and that of the tell-tale pointer, ceases. The corresponding pressure can be then read on the graduation on the lever 5 or on the bar 8 or on a graduation inscribed on the outside of the housing. Instead of the mechanically operating tell-tale pointer 13 an electrical signal-lamp can also be used. It is evident, that the calibration line showing the pressure acting on the piston as the function of the distance of the spring from the lever fulcrum will be a straight line. The slope of the calibration line can be altered either by increasing the lever arm of the piston force, or by moving the bar 8 vertically by means of the adjusting screws 9a and 9b, changing thereby the pre-compression of the spring, taking care that the bar 8 remains parallel with the lever 5, in the lowermost position of the latter.

It will be evident that during measurement the pre-compression of the spring remains constant apart from the small amount of variation due to the limited motion of the lever 5. Fatigue effects due to repeated stress and relaxation—which exist in prior type instruments—are thereby avoided. Furthermore, no high degree of accuracy or uniformity in the manufacture of the spring 10 is necessary because the desired value of the acting spring force can be attained by means of the adjustment described above.

The arrangement illustrated in Fig. 1 provides an evenly graduated pressure scale. For special purposes it may be desirable to have an uneven scale, e. g., a gradation which is wider in the range having greater interest, and narrower in the range having less interest. This can be attained by placing the bar 8 not parallel, but at a small angle to the lever 5 whereby the precompression of the spring will be dependent on its position along the lever. The pressure gradations will be wider in the higher pressure range if the spring force decreases with increasing distance from the fulcrum, as shown in Fig. 2 and vice versa as shown in Fig. 3. In Fig. 4 the calibration charts are shown for the various lever adjustments, the line I corresponding to Fig. 1, the line II corresponding to Fig. 2 and the line III corresponding to Fig. 3. In fact any desired shape of calibration line can be obtained by giving the lever 5, or bar 8, or both a suitably curved shape.

The adjustments according to Fig. 2 and Fig. 3 introduce a contamination into the pure principle of Fig. 1 because the stiffness and accuracy of the spring 10 becomes an influencing factor, and also some fatigue effects will be introduced. Nevertheless a substantial part of the advantages will be preserved because the range of the spring compression will be less than that in prior type instruments in which the spring force is directly applied to the piston without any interposed lever arrangement.

The described principle can be embodied in various forms. In Figs. 5 and 6 another embodiment is shown in which a ring spring 14 is employed which exerts a force on the piston 3 through the intermediary bell-crank lever 15. Displacing the ring in the direction of its axis upwards increases, shifting it downwards decreases the force exerted upon the piston. The spring is shifted by means of the four-claw lifter 16 actuated by the screw 17 which latter is arranged preferably coaxially with the ring. The desired tensioning of the spring is attained by the adjusting screws 19a and 19b acting upon the bar 18 whereby the desired pressure scale can be attained. The oscillations of the bell-crank lever—which are kept at a small magnitude in a manner similar to that of lever 5 in Fig. 1—are made more clearly visible either by a mechanical tell-tale pointer, or by an electrical contactor operating a signal-lamp of the neon-light type diagrammatically indicated at 13a.

Another embodiment is shown in Fig. 7 in which a helical spring 20 is used similarly to Fig. 1 but instead of the straight line displacement of the shell 21 it is rotated about a fulcrum 22 thus allowing the change of leverage of the spring force with respect to the fulcrum 26 of the lever 25. A pointer 23, attached to the shell 21 and rotating together with it, or at a fixed multiplication to it, will then indicate the loading of the piston 3 on an empirically graduated scale. This arrangement lacks the accuracy of the previously described embodiments because the leverage of the spring force as exerted on the lever 25 does not change uniformly with the angle of rotation of the shell 21. But it has the merit of simple and compact construction and it provides sufficient accuracy in cases in which the pressure to be measured varies in a narrow range.

In Fig. 8 a modification of Fig. 7 is shown the position of the spring being unaltered, and the position of the fulcrum 27 being variable, thus providing for the variability of the lever ratio of the spring force with respect to that of the piston force.

In Fig. 9 another embodiment is shown in which both the fulcrum 28 of the lever 29, and the position of the spring remain unchanged, and the position of the point of attack of the piston force is changed by means of the piston rod 30 which can be tilted into various positions during the process of measurement. It will be readily seen that also this arrangement provides for the variability of the lever ratio of the spring force with respect to that of the piston force which is the basic feature of this invention.

As a final example the Fig. 10 shows an embodiment with a compound lever 31 and 32. The position of the fulcrum 33 of the lever 31 remains unchanged, and also the position of the point of attack of the piston force and that of the spring force remain unaltered. The variation of the lever ratio is attained by shifting the position of the connecting pin 34 along the levers 31 and 32.

It will be evident from the examples of embodiments described that my improved type maximum pressure gauge offers the advantages of easy calibration and freedom from errors of spring, of fatigue and of temperature.

While I have described and illustrated instruments intended primarily for internal combustion engines, similar instruments may be used on steam engines, compressors, water pumps and injection systems of Diesel engines. Furthermore, pressure gauges may be built on the described principle for measuring the minimum value of variable pressures. Of course such instruments can be used also for the measurement of non-fluctuating pressures, and can serve not only for measurement but also for the purposes of control.

It is understood that the described and illustrated embodiments are only examples which can be modified in several ways. Thus instead of helical and ring springs, also leaf, diaphragm, and torsional springs may be used. For taking a reading not only scales, but dials, micrometer head or counter can be built into these instruments. The term piston includes also diaphragm and plunger. Instead of using a single piston, lever and spring two or more of these elements may be used in combination. And there are other ways in which the essential elements and their arrangement in my invention may be modified by those skilled in the art without departing from the principles of my invention and from the scope of the appended claims.

What I claim is:

1. A pressure gauge comprising a housing, a cylinder arranged in said housing, a piston movable in said cylinder and subjected to the pressure to be measured, a fulcrum arranged in said housing, a lever pivoted about said fulcrum, means for transmitting the force of said piston to said lever so as to exert thereon a moment about said fulcrum, a bar mounted in said housing substantially parallel with said lever, a spring under strain exerting a force between said bar and said lever so as to exert on said lever a moment about said fulcrum counteracting the moment of said piston force, means for displacing said spring along said lever and bar whereby the ratio of the lever arm of said piston force to the lever arm of said spring force with reference to said fulcrum can be changed and the two said moments equalized and means to indicate the position of said spring along said lever as a measure of the piston force when the moments are equalized.

2. A pressure gauge comprising a framework, a cylinder arranged in said framework, a piston movable in said cylinder and subjected to the pressure to be measured, a fulcrum arranged on said framework, a bell crank lever pivoted about said fulcrum one arm of which is substantially perpendicular to and the other arm of which is substantially parallel with the axis of said piston, a bar mounted on said framework substantially parallel with the axis of said piston, means for transmitting the force of said piston to said lever arm perpendicular to said piston axis, so as to exert on said lever a moment about said fulcrum, a ring shaped spring bearing at its two diametrally opposed points against said bar and said lever arm parallel with said piston axis so as to exert on said lever a moment about said fulcrum counteracting the moment of said piston force, means for displacing said ring shaped spring along said bar and along said lever arm parallel with said piston axis whereby the ratio of the lever arm of said piston force to that of said spring force with reference to said fulcrum can be changed and the two said moments equalized and means to indicate the position of the spring along the bar and lever arm parallel with said piston axis as a measure of the piston force when the two moments are equalized.

3. A pressure gauge comprising a housing, a cylinder arranged in said housing, a piston movable in said cylinder and subjected to the pressure to be measured, a lever, means for transmitting the force of said piston to said lever at a point, a spring under strain so as to exert a force, means for transmitting the force of said spring to said lever at another point, a fulcrum for said lever, means for displacing said fulcrum along said lever so as to change the ratio of lever arm of said piston force with respect to the lever arm of said spring force about said fulcrum and to equalize thereby the moment of said piston force to the moment of said spring force about said fulcrum and means to indicate the position of the fulcrum along the lever as a measure of the piston force when the two moments are equalized.

4. A pressure gauge for determining the extreme value of a fluctuating pressure comprising a framework, a pressure-chamber arranged in said framework, a pressure-responsive element arranged in said pressure chamber exposed to said fluctuating pressure and exerting a pressure-force, a preloaded spring exerting a spring-force, a fulcrum, a lever pivoted about said fulcrum and acted upon by said pressure-force and by said spring force in opposition to each other, means for altering the ratio of leverage of said pressure-force to that of said spring-force on said lever with reference to said fulcrum, signaling means for indicating when the moment of said pressure-force and the moment of said spring-force are in equilibrium, a scale showing the said leverage ratio as a measure of the pressure corresponding to said equilibrium condition.

5. A pressure gauge comprising a pivoted lever, a pressure responsive element arranged to exert a force on said lever in response to pressure, a pre-stressed spring exerting a force on said lever in opposition to the pressure force, means for altering the ratio of leverage of said pressure force to that of said pre-stressed spring force with reference to the pivot of the lever and means to indicate when the moments of the pressure force and of the pre-stressed spring force are in equilibrium and means to indicate the leverage ratio as a measure of the pressure force corresponding to said equilibrium condition.

KALMAN JOHN DE JUHASZ.